(12) United States Patent
Saeki

(10) Patent No.: US 11,756,552 B2
(45) Date of Patent: Sep. 12, 2023

(54) VOICE RECOGNITION APPARATUS, VOICE RECOGNITION METHOD, AND PROGRAM

(71) Applicant: Panasonic Intellectual Property Management Co., Ltd., Osaka (JP)

(72) Inventor: Natsuki Saeki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 514 days.

(21) Appl. No.: 17/083,962

(22) Filed: Oct. 29, 2020

(65) Prior Publication Data

US 2021/0043213 A1   Feb. 11, 2021

Related U.S. Application Data

(63) Continuation of application No. PCT/JP2019/006085, filed on Feb. 19, 2019.

(30) Foreign Application Priority Data

May 18, 2018   (JP) ................................. 2018-096486

(51) Int. Cl.
   *G10L 15/22*   (2006.01)
   *G10L 15/26*   (2006.01)

(52) U.S. Cl.
   CPC .............. *G10L 15/26* (2013.01); *G10L 15/22* (2013.01); *G10L 2015/223* (2013.01)

(58) Field of Classification Search
   None
   See application file for complete search history.

(56) References Cited

U.S. PATENT DOCUMENTS

| 4,870,686 A | * | 9/1989 | Gerson | .................. G10L 15/22 704/E15.04 |
| 5,129,002 A | * | 7/1992 | Tsuboka | ................ G10L 15/144 704/E15.029 |

(Continued)

FOREIGN PATENT DOCUMENTS

| JP | 2000-356998 | 12/2000 |
| WO | 2018/047436 | 3/2018 |

OTHER PUBLICATIONS

International Preliminary Report on Patentability and Written Opinion of The International Searching Authority dated Nov. 24, 2020 in International (PCT) Application No. PCT/JP2019/006085.

(Continued)

*Primary Examiner* — Neeraj Sharma
(74) *Attorney, Agent, or Firm* — Wenderoth, Lind & Ponack, L.L.P.

(57) ABSTRACT

A voice recognition apparatus includes: a communication circuit acquiring a speech sentence that is a result of voice recognition of a speech; a storage storing digit number information indicative of the maximum number of digits; and a control circuit. When the number of digits of a first numerical value indicated by a first numeral included in the speech sentence is larger than the maximum number of digits, the control circuit replaces the first numeral in the speech sentence with a second numeral indicative of a second numerical value having the number of digits equal to or less than the maximum number of digits. The control circuit divides the first numeral into a plurality of numerals and adds numerical values respectively indicated by the plurality of numerals to calculate the second numerical value.

5 Claims, 12 Drawing Sheets

(56) References Cited

U.S. PATENT DOCUMENTS

| | | | |
|---|---|---|---|
| 6,298,131 B1* | 10/2001 | Veschi | H04M 1/27485 |
| | | | 379/355.06 |
| 6,366,649 B1* | 4/2002 | Chun | G10L 15/063 |
| | | | 379/88.04 |
| 7,495,585 B2* | 2/2009 | Vainio | G06F 3/167 |
| | | | 400/477 |
| 8,296,145 B2 | 10/2012 | Clark et al. | |
| 10,276,185 B1* | 4/2019 | Ma | G10L 25/78 |
| 10,491,750 B2* | 11/2019 | Wang | H04M 3/42382 |
| 10,776,355 B1* | 9/2020 | Batsakis | G06F 16/2471 |
| 2002/0007270 A1* | 1/2002 | Murashima | G10L 25/78 |
| | | | 704/215 |
| 2004/0199388 A1* | 10/2004 | Armbruster | G10L 15/22 |
| | | | 704/E15.04 |
| 2014/0157143 A1* | 6/2014 | Ronkainen | G06F 3/0484 |
| | | | 715/744 |
| 2017/0052905 A1* | 2/2017 | Lin | G06F 12/126 |
| 2018/0210643 A1* | 7/2018 | Ghassabian | G06F 3/04883 |
| 2019/0103099 A1* | 4/2019 | Panainte | G10L 15/063 |
| 2019/0243902 A1 | 8/2019 | Saeki et al. | |
| 2020/0310614 A1* | 10/2020 | Choi | G06F 3/147 |

OTHER PUBLICATIONS

Extended European Search Report dated Jun. 8, 2021 in European Application No. 19802810.2.
International Search Report dated Mar. 26, 2019 in International (PCT) Application No. PCT/JP2019/006085.
Office Action dated May 16, 2023 in corresponding European Application No. 19802810.2.

* cited by examiner

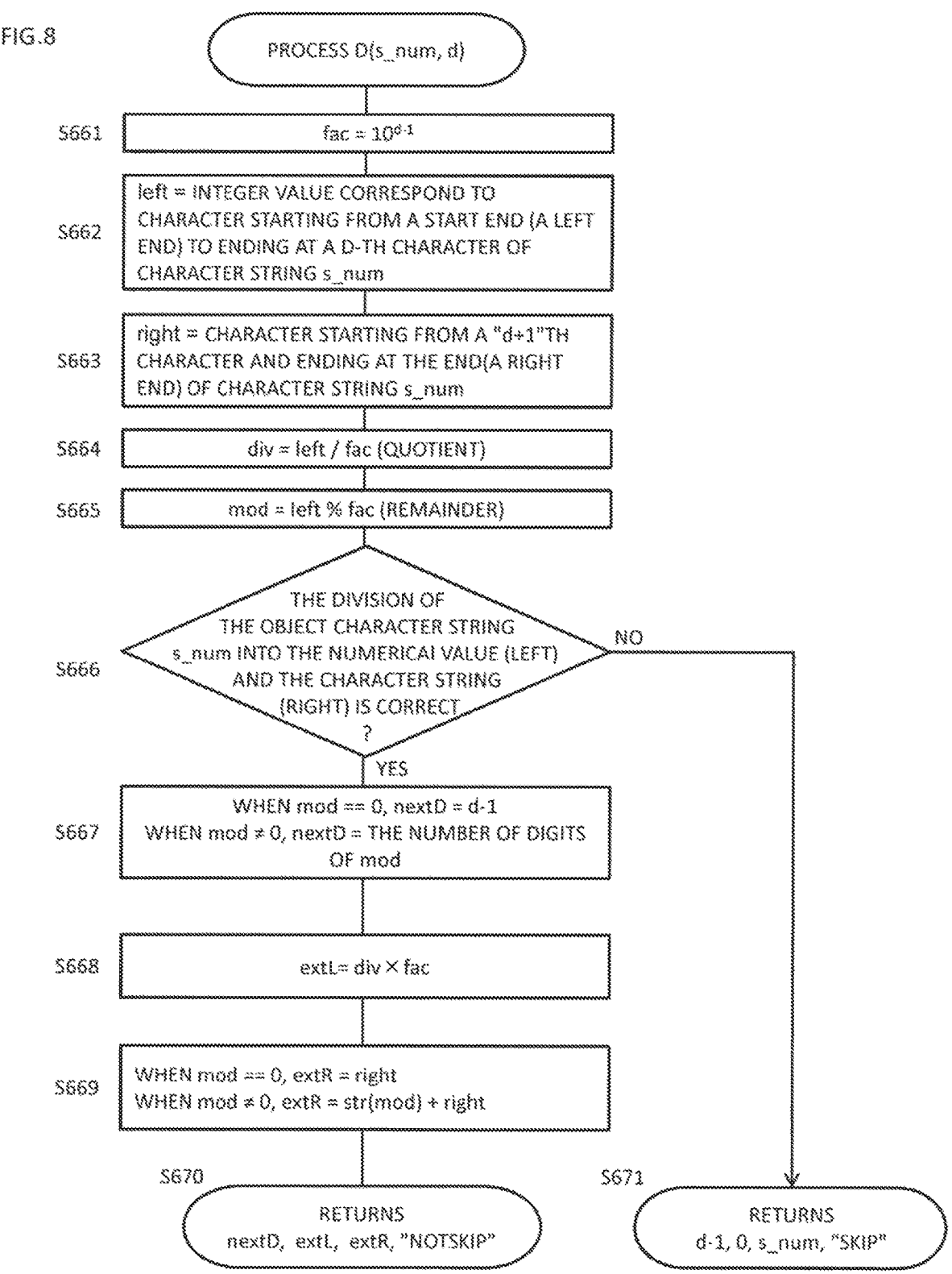

VOICE RECOGNITION APPARATUS, VOICE RECOGNITION METHOD, AND PROGRAM

CROSS-REFERENCE TO RELATED APPLICATIONS

This is a continuation application of International Application No. PCT/JP2019/006085, with an international filing date of Feb. 19, 2019, which claims priority of Japanese Patent Application No. 2018-096486 filed on May 18, 2018, each of the content of which is incorporated herein by reference in its entirety.

TECHNICAL FIELD

The present disclosure relates to a voice recognition apparatus, a voice recognition method, and a computer program for recognizing a voice of speech.

BACKGROUND ART

Japanese Laid-Open Patent Publication No. 2000-356998 discloses a voice recognition apparatus recognizing a voice of a speaker. This voice recognition apparatus generates a voice recognition resource describing a number for each of digits of a product unit price and extracts and recognizes a number for each of digits included in the voice from the numbers of respective digits in the voice recognition resource. This reduces a storage amount of the voice recognition resource and prevents erroneous recognition of a numerical value in the voice.

SUMMARY

The present disclosure provides a voice recognition apparatus, a voice recognition method, and a computer program.

In one general aspect, a voice recognition apparatus of the present disclosure includes: an communication circuit acquiring a speech sentence that is a result of voice recognition of a speech; a storage storing digit number information indicative of the maximum number of digits; and a control circuit, when a number of digits of a first numerical value indicated by a first numeral included in the speech sentence is larger than the maximum number of digits, replacing the first numeral in the speech sentence with a second numeral indicative of a second numerical value having the number of digits equal to or less than the maximum number of digits, and the control circuit divides the first numeral into a plurality of numerals and adds numerical values respectively indicated by the plurality of numerals to calculate the second numerical value.

These general and specific aspects may be implemented by a system, a method, and a computer program, as well as a combination thereof.

Additional benefits and advantages of the disclosed embodiments will be apparent from the specification and Figures. The benefits and/or advantages may be individually provided by the various embodiments and features of the specification and drawings, and need not all be provided in order to obtain one or more of the same.

According to the voice recognition apparatus of the above general aspect, the voice recognition method, and the computer program of the present disclosure, when the number of digits of a first numerical value indicated by a first numeral included in the speech sentence is larger than the maximum number of digits, the first numeral in the speech sentence is replaced with a second numeral indicative of a second numerical value having the number of digits equal to or less than the maximum number of digits. As a result, the voice recognition error of a numeral can be reduced.

BRIEF DESCRIPTION OF DRAWINGS

FIG. 8 is a flowchart for explaining a process D.

DETAILED DESCRIPTION

Knowledge Underlying the Present Disclosure

When a speaker utters a numeral with pauses or slowly, the numeral may erroneously be recognized in voice recognition. For example, if a speaker utters "123" as "one hundred, twenty, three" with pauses between "one hundred" and "twenty" and between "twenty" and "three", "123" are erroneously recognized as "100203".

A voice recognition apparatus of the present disclosure corrects an erroneously recognized numeral. The erroneously recognized numeral refers to a numeral indicative of a numerical value having the number of digits larger than a preset maximum number of digits. When a numerical value indicated by a numeral in a speech sentence acquired as a result of voice recognition of speech has the number of digits larger than the maximum number of digits, the voice recognition apparatus changes the numeral in the speech sentence to indicate a numerical value having the number of digits equal to or less than the maximum number of digits. The maximum number of digits is preset depending on a place where the voice recognition apparatus is used. For example, if the voice recognition apparatus is used at the front desk of a hotel, the maximum number of digits is set to the maximum number of digits of the room number in the hotel. If the voice recognition apparatus is used in an airport or an aircraft, the maximum number of digits is set to the maximum number of digits of the flight number. For example, when the maximum number of digits is "3", and the voice recognition apparatus acquires a speech sentence including a numeral "100203" as a result of voice recognition from a voice recognition server, the voice recognition apparatus corrects the numeral "100203" to "123" having the number of digits equal to or less than the maximum number of digits, three. Therefore, the numeral in the speech sentence is corrected so that the numeral in the speech sentence indicates a numerical value having the number of digits equal to or less than the maximum number of digits. As a result, the voice recognition error of a numeral is reduced.

Embodiments

Embodiments will now be described with reference to the drawings.

1. Configuration 1-1. Appearance of Voice Recognition Apparatus

Figure 1:
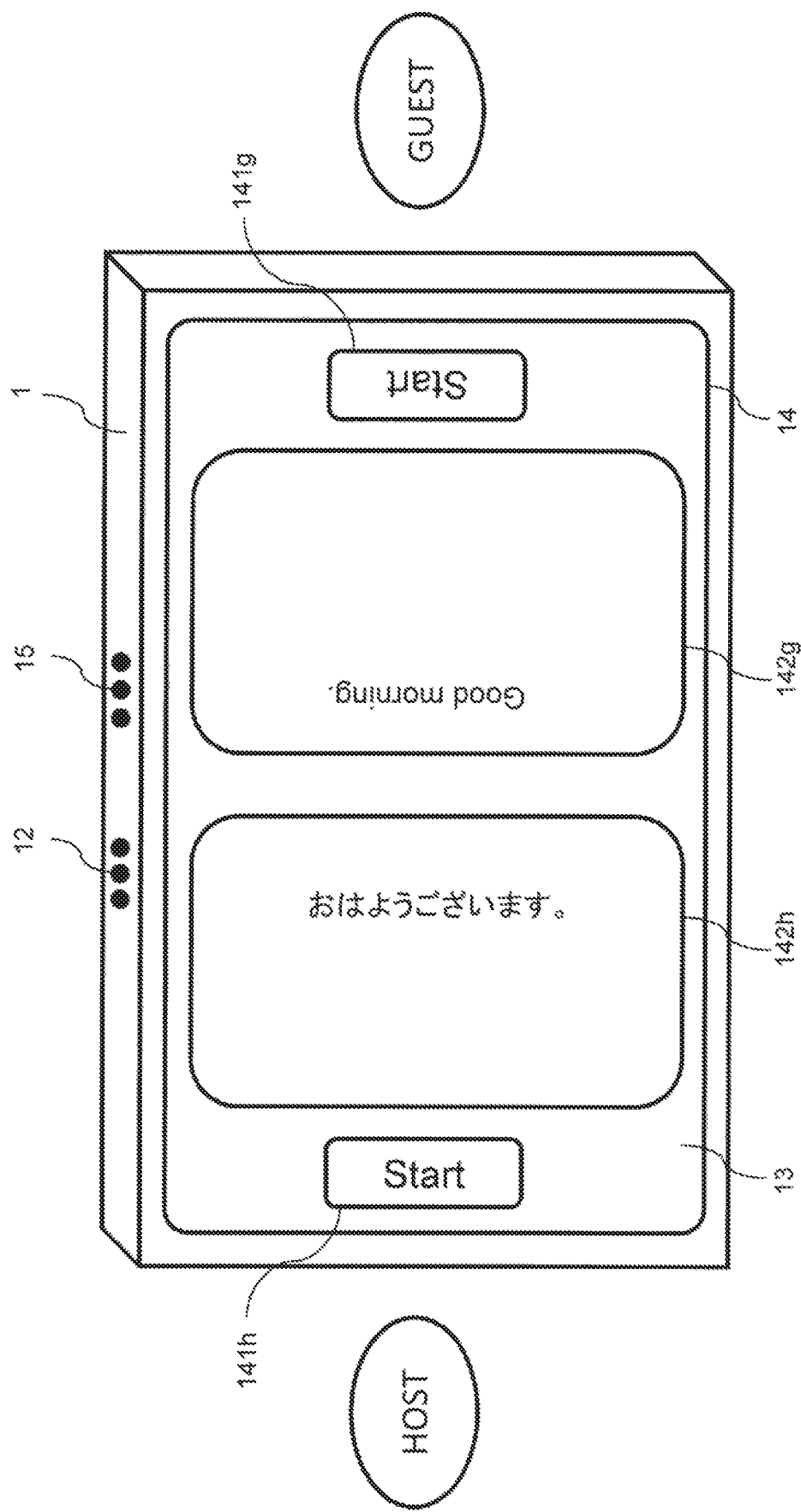
FIG. 1 is a diagram showing an appearance of a voice recognition apparatus.

FIG. 1 shows an example of an appearance of a voice recognition apparatus according to this embodiment. A voice recognition apparatus 1 is a tablet type apparatus, for example. For example, a host speaking a first language and a guest speaking a second language have a conversation face-to-face via the voice recognition apparatus 1. The voice recognition apparatus 1 performs voice recognition and translates the conversation between two users speaking different languages, for example.

The voice recognition apparatus 1 includes a microphone 12, a touch panel 13, a display 14, and a speaker 15. The microphone 12 and the speaker 15 are arranged near openings on a side surface of the voice recognition apparatus 1, for example. The touch panel 13 and the display 14 are arranged on a principal surface of the voice recognition apparatus 1. A speech icon 141$h$ and a display area 142$h$ are arranged in an area on the host side that is one side in the longitudinal direction of the display 14. A speech icon 141$g$ and a display area 142$g$ are arranged in an area on the guest side that is the other side in the longitudinal direction of the display 14. The speech icons 141$h$, 141$g$ are operated through a touch operation by a user.

The speech icon 141$h$ is an operation icon used, when the host speaks, i.e., when the speech in the first language is input to the voice recognition apparatus 1, by the host himself/herself for specifying a start time point and an end time point of speech of the host. The speech icon 141$g$ is an operation icon used, when the guest speaks, i.e., when the speech in the second language is input, by the guest himself/herself for specifying a start time point and an end time point of speech of the guest. The display areas 142$h$, 142$g$ are areas for displaying a speech sentence and a translated sentence as character strings.

1-2. Configurations of Voice Recognition Apparatus and Server

Figure 2:
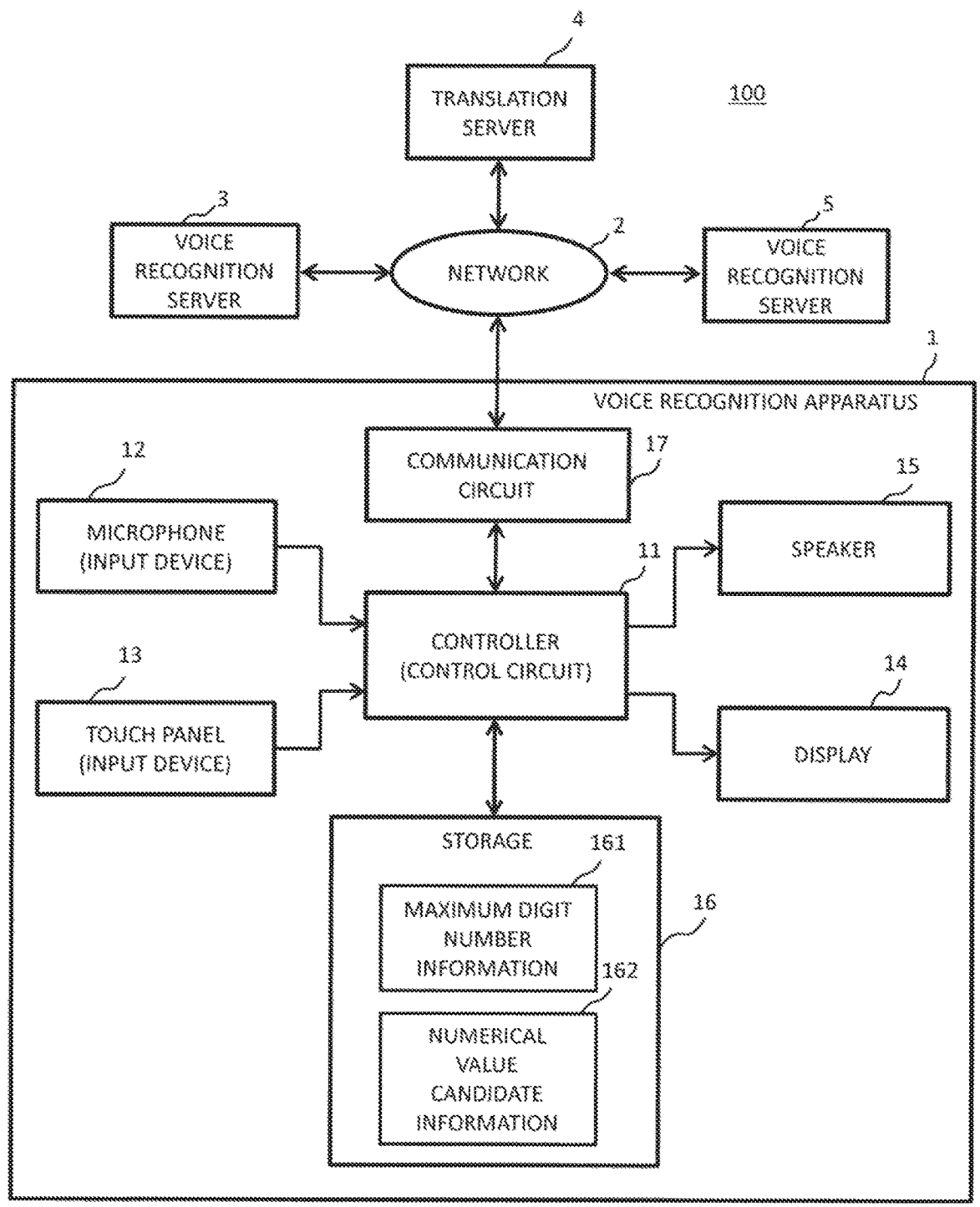
FIG. 2 is a block diagram showing an electrical configuration of a voice recognition system.

FIG. 2 is a block diagram showing an electrical configuration of a voice recognition system. The voice recognition system 100 has the voice recognition apparatus 1 shown in FIG. 1, a voice recognition server 3, a translation server 4, and a voice synthesis server 5. The voice recognition apparatus 1 performs data communication via a network 2 such as the Internet with each of the voice recognition server 3, the translation server 4, and the voice synthesis server 5.

The voice recognition apparatus 1 includes a controller 11, a storage 16, and a communication unit 17, in addition to the microphone 12, the touch panel 13, the display 14, and the speaker 15.

The controller 11 is a control circuit such as a CPU, or an MPU, and executes various computer programs stored in the storage 16 to control an overall operation of the voice recognition apparatus 1. The controller 11 reads out data and computer programs stored in the storage 16 and performs various arithmetic processing to implement a predetermined function. In this embodiment, the function of the controller 11 is implemented by cooperation of hardware and software; however, the controller 11 may be implemented only by a hardware circuit specifically designed to implement a predetermined function. Therefore, the control unit 11 can be not only a CPU or an MPU, but also a DSP, an FPGA, an ASIC, etc.

The microphone 12 is an apparatus converting an input voice into digital voice data. Specifically, the microphone 12 converts a voice into a voice signal that is an analog electric signal and further converts the voice signal into digital voice data through an AD converter.

The touch panel 13 is arranged to overlap with the display 14. The touch panel 13 accepts an instruction from the user.

The microphone 12 and the touch panel 13 are examples of an input device allowing input to the voice recognition apparatus 1 from the outside, for example, accepting a voice of the user and an instruction of the user. The voice recognition apparatus 1 may include not only the microphone 12 and the touch panel 13 but also a keyboard, a button, a switch, a camera, and a combination thereof as the input device.

The display 14 is a display unit displaying an image and is build up with, for example, a liquid crystal display device or an organic EL display device. The display displays the speech icons 141$h$, 141$g$. The display 14 displays images represented by text data of a speech sentence and a translated sentence in the display areas 142$h$, 142$g$.

The speaker 15 is an apparatus converting a voice signal that is an electrical signal, into a voice. The speaker 15 outputs a voice based on the voice signal.

The display 14 and the speaker 15 are examples of an output unit for making output to the outside from the voice recognition apparatus 1, for example, for outputting a speech sentence and a translated sentence as well as the voice corresponding to the translated sentence to the outside.

The storage 16 is a recording medium such as a flash memory, a ferroelectric memory, an HDD, an SSD, a RAM, a combination thereof, etc. The storage 16 stores various computer programs for the controller 11. The storage 16 stores digital voice data, text data of a speech sentence, and text data of a translated sentence.

In this embodiment, the storage 16 stores maximum digit number information 161 and numerical value candidate information 162. The maximum digit number information 161 indicates the maximum number of digits. The numerical value candidate information 162 indicates one or more numerical value candidates. For example, when the voice recognition apparatus 1 is used in an airport or an airplane, the maximum digit number information 161 indicates the maximum number of digits of the numerical portion of the flight number (e.g., four), and the numerical value candidate information 162 indicates the numerical portion of the flight number. For example, when the voice recognition apparatus 1 is used in a hotel, the maximum digit number information 161 indicates the maximum number of digits of a numerical portion of the room number in the hotel (e.g., three), and the numerical value candidate information 162 indicates the numerical portion of the room number.

The communication unit 17 is a communication module or a communication circuit performing data communication with the voice recognition server 3, the translation server 4, and the voice synthesis server 5 via the network 2 in accordance with a communication method such as Bluetooth (registered trademark), Wi-Fi (registered trademark), 3G, LTE (registered trademark), and IEEE 802.11. The communication unit 17 is an example of an acquisition unit acquiring text data of a speech sentence from the voice recognition server 3.

When the voice recognition server 3 receives the digital voice data from the voice recognition apparatus 1 via the network 2, the voice recognition server 3 recognizes a voice from the received digital voice data. The voice recognition server 3 generates text data of a speech sentence as a result of voice recognition.

The translation server 4 performs translation and reverse translation. Specifically, when receiving the text data of a speech sentence from the voice recognition apparatus 1 via the network 2, the translation server 4 translates the speech sentence to generate text data of a translated sentence. When receiving the text data of a translated sentence from the voice recognition apparatus 1 via the network 2, the translation server 4 reversely translates the translated sentence to generate text data of a reversely translated sentence.

When receiving the text data of a translated sentence from the voice recognition apparatus 1 via the network 2, the voice synthesis server 5 synthesizes a voice from the received text data of the translated sentence to generate a voice signal.

2. Operation

2-1. Overview of Numeral Correction

Figure 3:
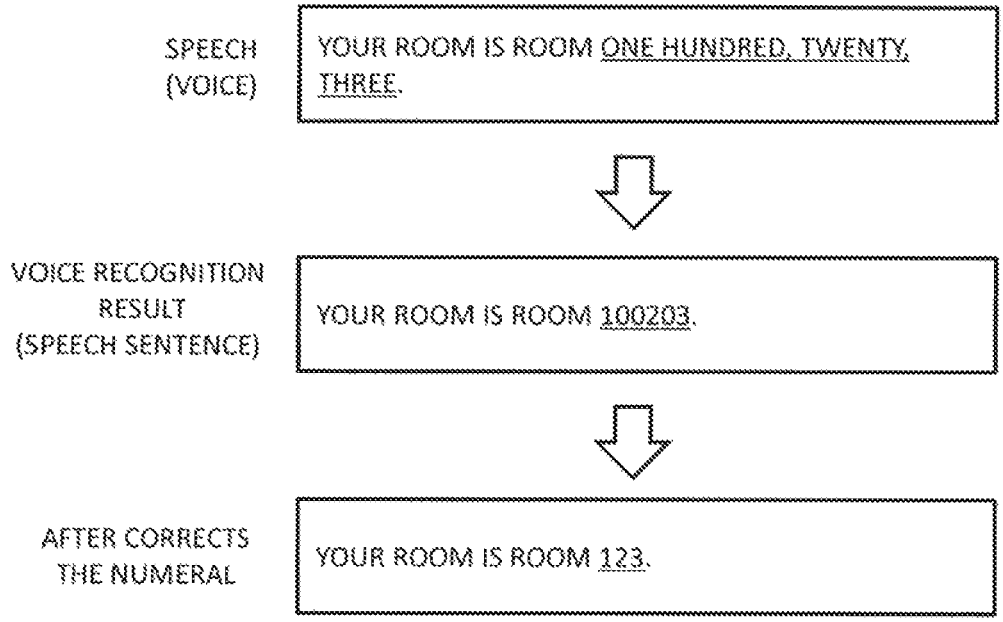
FIG. 3 is a diagram showing an example of numeric correction.

FIG. 3 shows an example of numeral correction. The voice recognition apparatus 1 acquires a user's speech from the microphone 12 and then transmits digital voice data corresponding to the speech to the voice recognition server 3. As a result, the voice recognition apparatus 1 acquires text data of a speech sentence from the voice recognition server 3. The text data of the speech sentence is character string data generated based on a voice of the user.

If a user utters a numeral with pauses as, for example, "your room is one hundred, twenty, three", the voice recognition server 3 may not correctly recognize "one hundred, twenty, three", and the speech sentence acquired from the voice recognition server 3 may be "your room is 100203". In such a case, the voice recognition apparatus 1 of this embodiment corrects the numeral "100203" in the speech sentence to a numeral indicative of the numerical value "123" having the number of digits equal to or less than the maximum number of digits (having three digits or less).

2-2. Overall Operation of Voice Recognition

Figure 4:
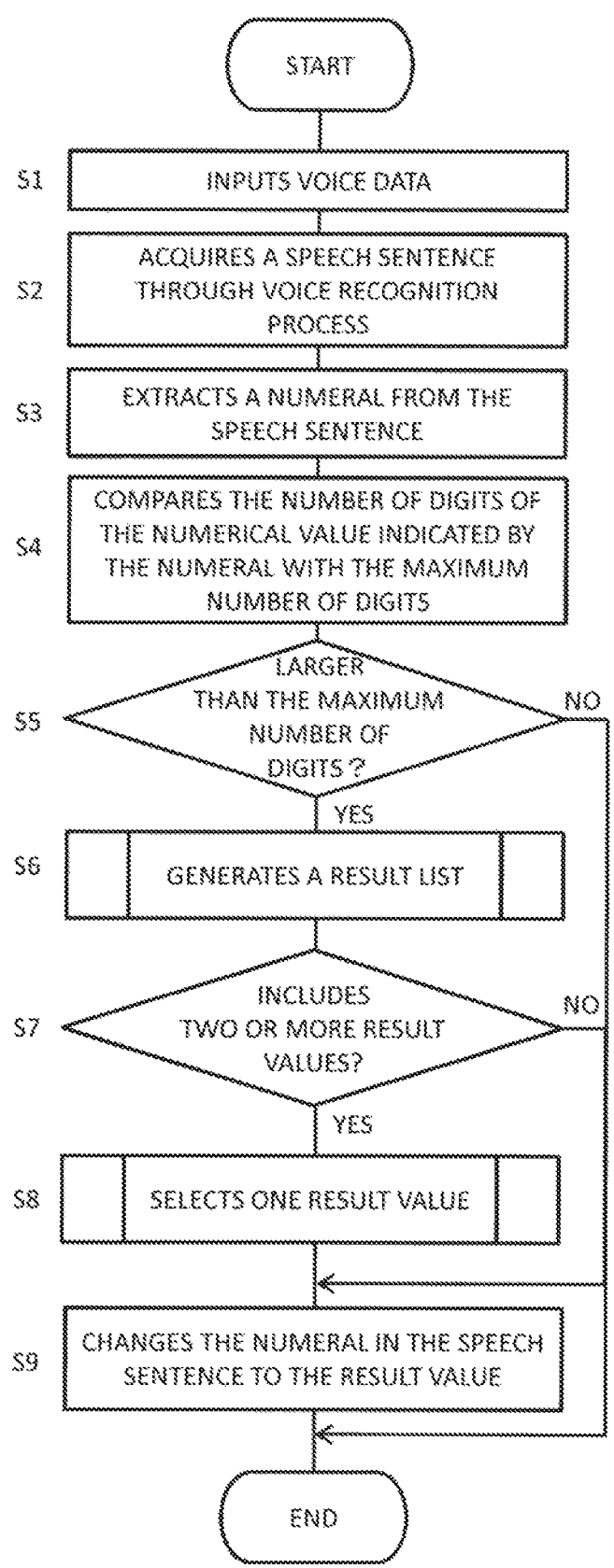
FIG. 4 is a flowchart for explaining an overall operation of voice recognition.

FIG. 4 shows an overall operation of voice recognition performed by the controller 11 of the voice recognition apparatus 1. The controller 11 inputs digital voice data corresponding to a voice of a speaker via the microphone 12 (S1).

The controller 11 acquires a speech sentence through voice recognition processing (S2). Specifically, the controller 11 transmits the digital voice data via the network 2 to the voice recognition server 3. The voice recognition server 3 recognizes a voice from the received digital voice data to generate text data of a speech sentence. The controller 11 receives the text data of the speech sentence from the voice recognition server 3 via the network 2.

The controller 11 extracts a numeral from the speech sentence (S3). For example, a numeral including a number from 0 to 9 is extracted from the speech sentence. The controller 11 compares the number of digits of the numerical value indicated by the extracted numeral with the maximum number of digits indicated by the maximum digit number information 161 (S4). The numerical value indicated by the extracted numeral is also referred to as an input value. The controller 11 determines whether the number of digits of the input value is larger than the maximum number of digits (S5), and if the number of digits of the input value is larger than the maximum number of digits, the process goes to step S6. If the number of digits of the input value is equal to or less than the maximum number of digits, the operation shown in FIG. 4 is terminated without performing the number correction at steps S6 to S9.

If the number of digits of the input value is larger than the maximum number of digits (Yes at S5), the controller 11 generates a result list based on the numeral in the speech sentence (S6). The result list includes a result value that is a numerical value having the number of digits equal to or less than the maximum number of digits.

The controller 11 determines whether the result list includes two or more result values (S7). If the result list includes only one result value (No at S7), the process goes to step S9. If two or more result values are included in the result list (Yes at S7), the controller 11 selects one result value (S8).

The controller 11 changes the numeral in the speech sentence to the numeral indicative of the result value (S9).

When the speech sentence is translated, the voice recognition apparatus 1 transmits the text data of the speech sentence to the translation server 4 after step S9 and receives the text data of the translation sentence from the translation server 4. The voice recognition apparatus 1 displays the received translated sentence on the display 14. When the translation result is output by voice, the voice recognition apparatus 1 transmits the text data of the translated sentence to the voice synthesis server 5 and receives the voice signal corresponding to the translated sentence. The voice recognition apparatus 1 outputs a voice corresponding to the translated sentence from the speaker 15.

2-3. Specific Examples of Generation of Result List

Specific examples of the generation of the result list (step S6 of FIG. 4) will be described with reference to FIGS. 5A and 5B.

Figure 5A:
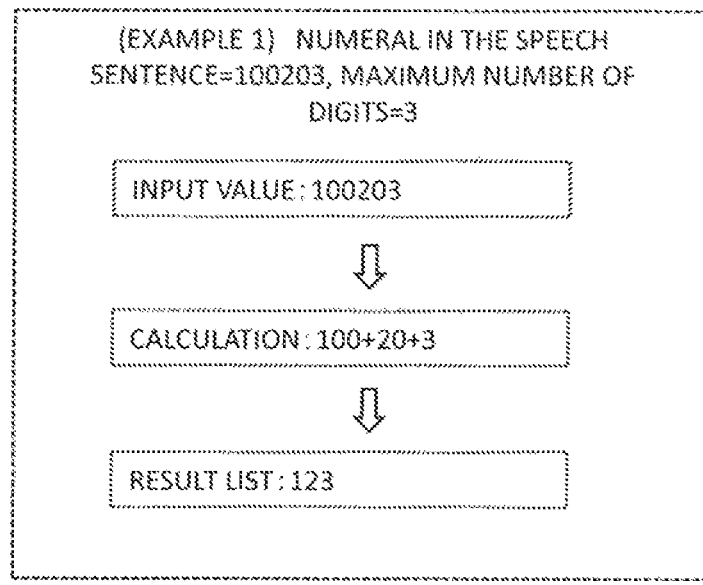
FIG. 5A is a diagram showing a specific example 1 of generation of a result list.

FIG. 5A shows a specific example 1 of the generation of the result list when the numeral extracted from the speech sentence is "100203" and the maximum number of digits is "3". In this case, the controller 11 divides the numeral "100203" into multiple numerals "100", "20", "3" and adds the numerical values indicated by the numerals. Therefore, "100+20+3" is calculated. As a result, the result list including the result value "123" is generated.

Figure 5B:
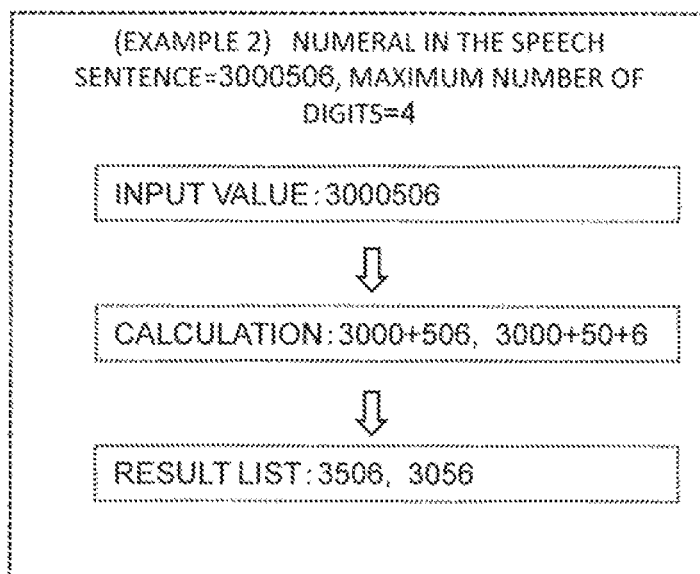
FIG. 5B is a diagram showing a specific example 2 of generation of a result list.

FIG. 5B shows a specific example 2 of the generation of the result list when the numeral extracted from the speech is "3000506" and the maximum number of digits is "4". In this case, the controller 11 divides the numeral "3000506" into multiple numerals "3000" and "506" and adds the numerical values indicated by the numerals. Therefore, "3000+506" is calculated. The numeral "3000506" is also divided into multiple numerals "3000", "50", and "6" to calculate "3000+50+6". As a result, the result list including the result values "3506" and "3056" is generated.

2-4. Generation of Result List

Figure 6:
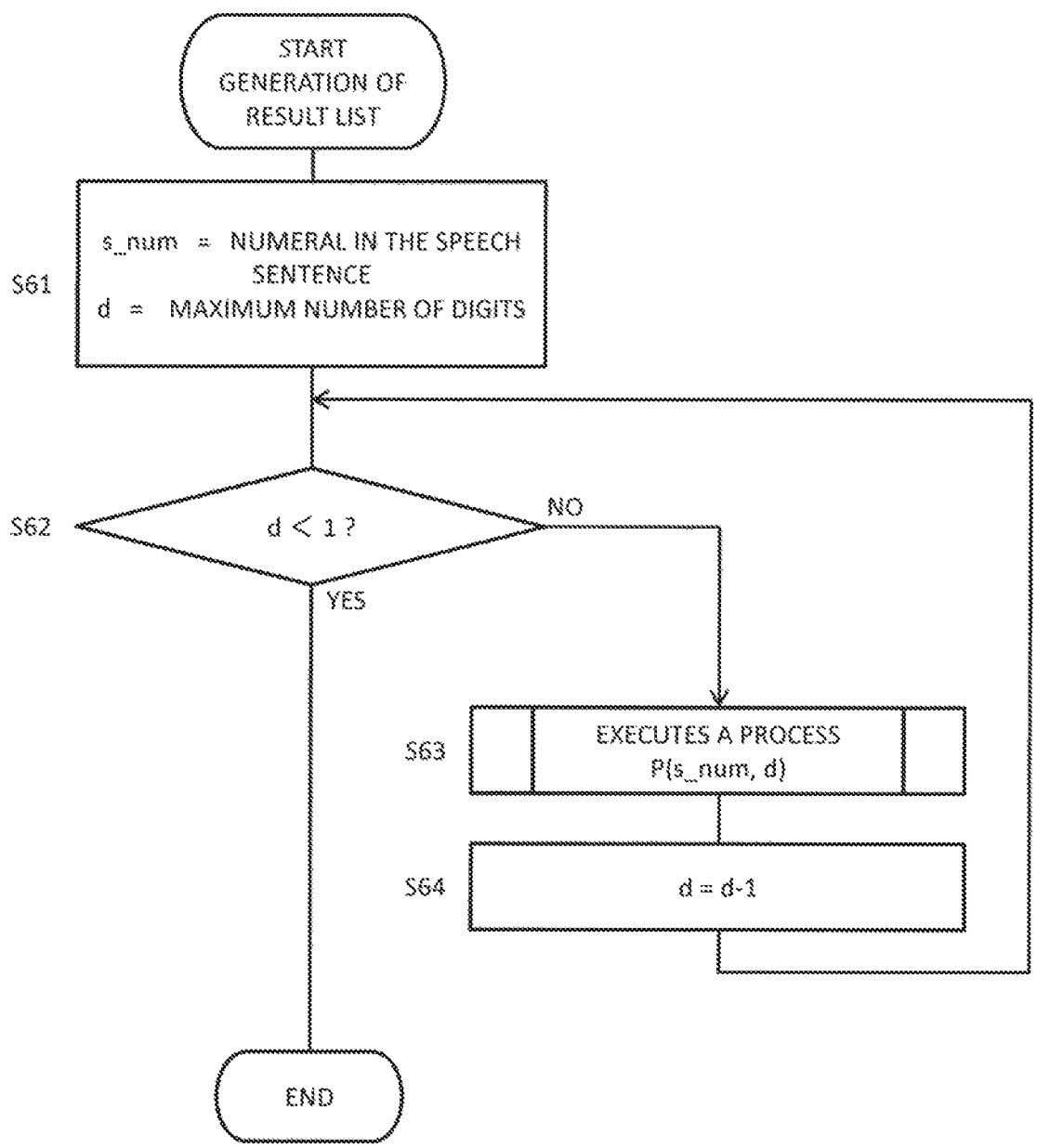
FIG. 6 is a flowchart for explaining a result list generating operation.
Figure 7:
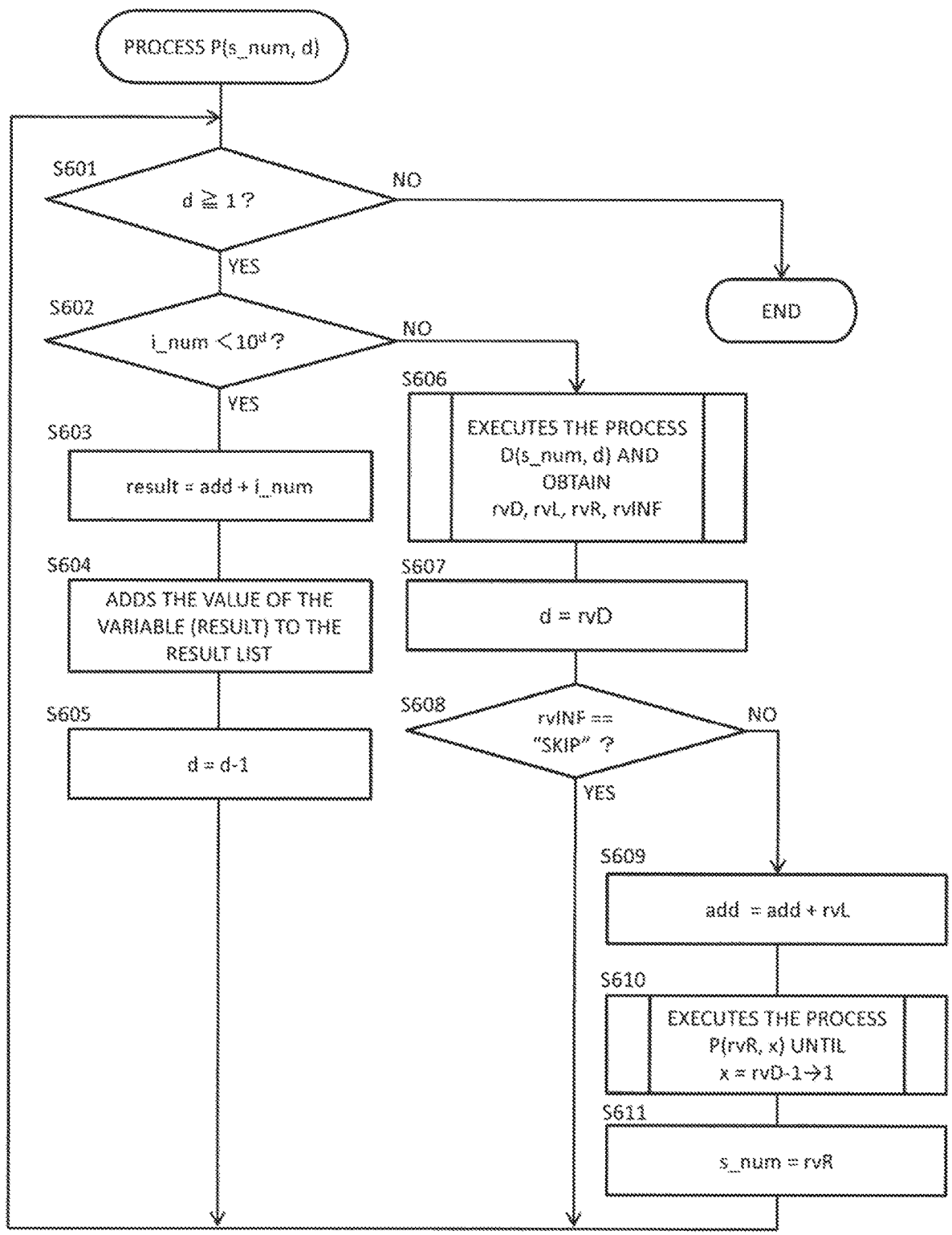
FIG. 7 is a flowchart for explaining a process P.

A specific operation at the time of generation of the result list from the numeral extracted from the speech sentence will be described with reference to FIGS. 6 to 8. FIG. 6 is a flowchart showing details of the generation of the result list, i.e., step S6 of FIG. 4. FIG. 7 is a flowchart for explaining details of a process P, i.e., step S63 of FIG. 6. FIG. 8 is a flowchart for explaining details of a process D, i.e., step S606 of FIG. 7.

In FIG. 6, the controller 11 sets initial values of an object character string s_num and the number of digits d (S61). The object character string s_num is a variable for assigning a character string to be processed. At step S61, the controller 11 assigns the numeral extracted from the speech sentence to the object character string s_num. The number of digits d is a variable for assigning the digit number. At step S61, the controller 11 assigns the maximum number of digits indicated by the maximum digit number information 161 to the number of digits d.

The controller 11 determines whether the number of digits d is smaller than 1 (S62). If the number of digits d is 1 or more (No at S62), the controller 11 executes a process P(s_num, d) shown in FIG. 7 (S63). The process P(s_num, d) is a process of calculating a numerical value having the number of digits of d or less from the object character string s_num. The process P(s_num, d) is executed by calling a function P(s_num, d) having the object character string s_num and the number of digits d as arguments, for example. The controller 11 decrements the number of digits d (S64) and returns to step S62.

When the number of digits d becomes smaller than (Yes at S62), the controller 11 terminates the operation shown in FIG. 6. As a result, the process P(s_num, d) is repeatedly executed until the number of digits d becomes 1 from the maximum number of digits.

2-5. Calculation of Numerical Value Having the Number of Digits Equal to or Less Than the Maximum Number of Digits (Process P)

The process P shown in FIG. 7 (step S63 of FIG. 6) will be described. The controller 11 determines whether the number of digits d is 1 or more (S601). If the number of digits d is smaller than 1 (No at S601), the operation shown in FIG. 7 is terminated.

If the number of digits d is 1 or more (Yes at S601), the controller 11 determines whether an integer value i_num indicated by the object character string s_num is smaller than $10^d$ (S602). The integer value i_num is a variable assigned with a value obtained by converting the object character string s_num into an integer.

If the integer value i_num is smaller than $10^d$ (Yes at S602), the value obtained by adding the integer value i_num to a value of a variable (add) is assigned to a variable (result) (S603). The variable (add) is a variable for assigning a numerical value being calculated. The initial value of the variable (add) is zero. The variable (result) is a variable for assigning a result value. The controller 11 adds the value of the variable (result) to the result list (S604). The controller 11 decrements the number of digits d (S605) and returns to step S601.

If the integer value i_num is $10^d$ or more (No at S602), the controller 11 executes the process D(s_num, d) shown in FIG. 8 and assigns an obtained return value to each variables rvD, rvL, rvR, rvINF (S606). The process D is a process of dividing the object character string s_num into an integer value having the number of digits equal to or less than the number of digits d and a character string. The process D(s_num, d) is executed by calling a function D(s_num, d) having the object character string s_num and the number of digits d as arguments, for example. The return values shown at step S670 or step S671 of FIG. 8 are assigned to the variables rvD, rvL, rvR, rvINF.

The variable rvD indicates the number of digits to be processed next. A value of a variable nextD or "d−1" is assigned to the variable rvD. The variable rvL indicates an integer value extracted from the object character string s_num. A value of a variable extL or "0" is assigned to the variable rvL. The variable rvR indicates a character string to be processed next. The character string indicated by a variable extR or a variable s_num is assigned to the variable rvR. The variable rvINF indicates whether to skip an addition process, in other words, whether to execute a process of adding the value of the variable rvL to the value of the variable (add). A return value "Notskip" or "Skip" is assigned to the variable rvINF.

The controller 11 assigns the value of the variable rvD to the number of digits d (S607). The controller 11 determines whether the variable rvINF indicates a skip of a process (S608). When the variable rvINF indicates the skip (Yes at S608), the controller 11 returns to step S601 without performing steps S609 to S611.

If the variable rvINF does not indicate the skip (No at S608), the controller 11 sets the value obtained by adding the value of the variable rvL to the value of the variable (add) as a new value of the variable (add) (S609).

The controller 11 executes the process P(rvR,x) until the number of digits x becomes "1" from "rvD−1" (S610). Therefore, a function P(rvR, x) having the character string rvR to be processed next and the number of digits x as arguments is recursively called.

The controller 11 assigns the character string rvR to be processed next to the object character string s_num (S611) and returns to step S601.

By the operation described above, when the number of digits of the integer value i_num of the object character string s_num is larger than the number of digits d (No at S602), the numerical value extracted from the object character string s_num, i.e., the value of the variable rvL, is added to the value of the variable (add) in the process D (S609). When the number of digits of the integer value i_num is equal to or less than the number of digits d (Yes at S602), the integer value i_num is added to the value of the variable (add) (S603), and the result value indicated by the variable (result) is added to the result list (S604). The number of digits d is reduced each time the calculation is performed, until the number of digits d becomes less than 1 from the maximum number of digits (S605, S607), and when the number of digits d becomes less than 1, the process P shown in FIG. 7 is terminated.

The process P(s_num, d) is repeatedly executed until the number of digits d becomes 1 from the maximum number of digits (S63), and the process P(rvR, x) is recursively executed in the process P(s_num, d) (S610), so that all the result values possibly having the number of digits equal to or less than the maximum number of digits can be calculated from the object character string s_num.

2-6. Division of Character String (Process D)

The process D (details of step S606) shown in FIG. 8 will be described. The controller 11 assigns $10^{d-1}$ to a variable fac (S661). The variable fac indicates a numerical value used for the calculation of step 664 and S665. At step S662 and step S663, the controller 11 divides the object character string s_num into two. Specifically, the controller 11 assigns a number starting from a start end, i.e., a left end, and ending at a d-th character of the object character string s_num as an integer value to a numerical value (left) (S662). The numerical value (left) is a variable for assigning an integer value extracted from the object character string s_num. The controller 11 assigns a number starting from a "d+1"th character and ending at the end, i.e., a right end, of the object character string s_num as a character string to a character string (right) (S663). The character string (right) is a variable for assigning a character string extracted from the object character string s_num. The controller 11 calculates a quotient div from "left/fac" (S664). The controller 11 calculates a remainder mod of "left/fac" (S665). The quotient div and the remainder mod are variables for assigning numerical values.

The controller 11 determines whether the division of the object character string s_num into the numerical value (left) and the character string (right) is correct in terms of a result of voice recognition (S666). Specifically, when "the character string (right) is not empty and the numerical value (left) is not divisible by 10" or "the start end or the left end of the character string (right) is 0", it is determined that the result of voice recognition is incorrect.

If the result of voice recognition is correct (Yes at step S666), the values of the variables nextD, extL, extR for assigning the return values are set at steps S667 to S669. Specifically, if the remainder mod is zero, "d−1" is assigned to the variable nextD, and if the remainder mod is not zero, the number of digits of the remainder mod is assigned to the variable nextD (S667). The controller 11 assigns the value obtained by "div×fac" to the variable extL (S668). If the remainder mod is zero, the controller 11 assigns the character string (right) to the variable extR, and if the remainder mod is not zero, the controller 11 assigns "character string of remainder mod+character string (right)" to variable extR (S669). The controller 11 returns nextD, extL, extR, and "Notskip" (S670). As a result, the numerical value indicated by the variable nextD, the numerical value indicated by the variable extL, the character string indicated by the variable extR, and "Notskip" are assigned to the variables rvD, rvL, rvR, and rvINF, respectively, at step S606 of FIG. 7.

If the result of voice recognition is not correct (No at S666), d−1, 0, s_num, and "Skip" are returned (S671). As a result, the return values d−1, 0, the character string indicated by the variable s_num, and "Skip" are assigned to the variables rvD, rvL, rvR, and rvINF, respectively, at step S606 of FIG. 7.

2-7. Specific Example 1 of Process Flow

Figure 9A:
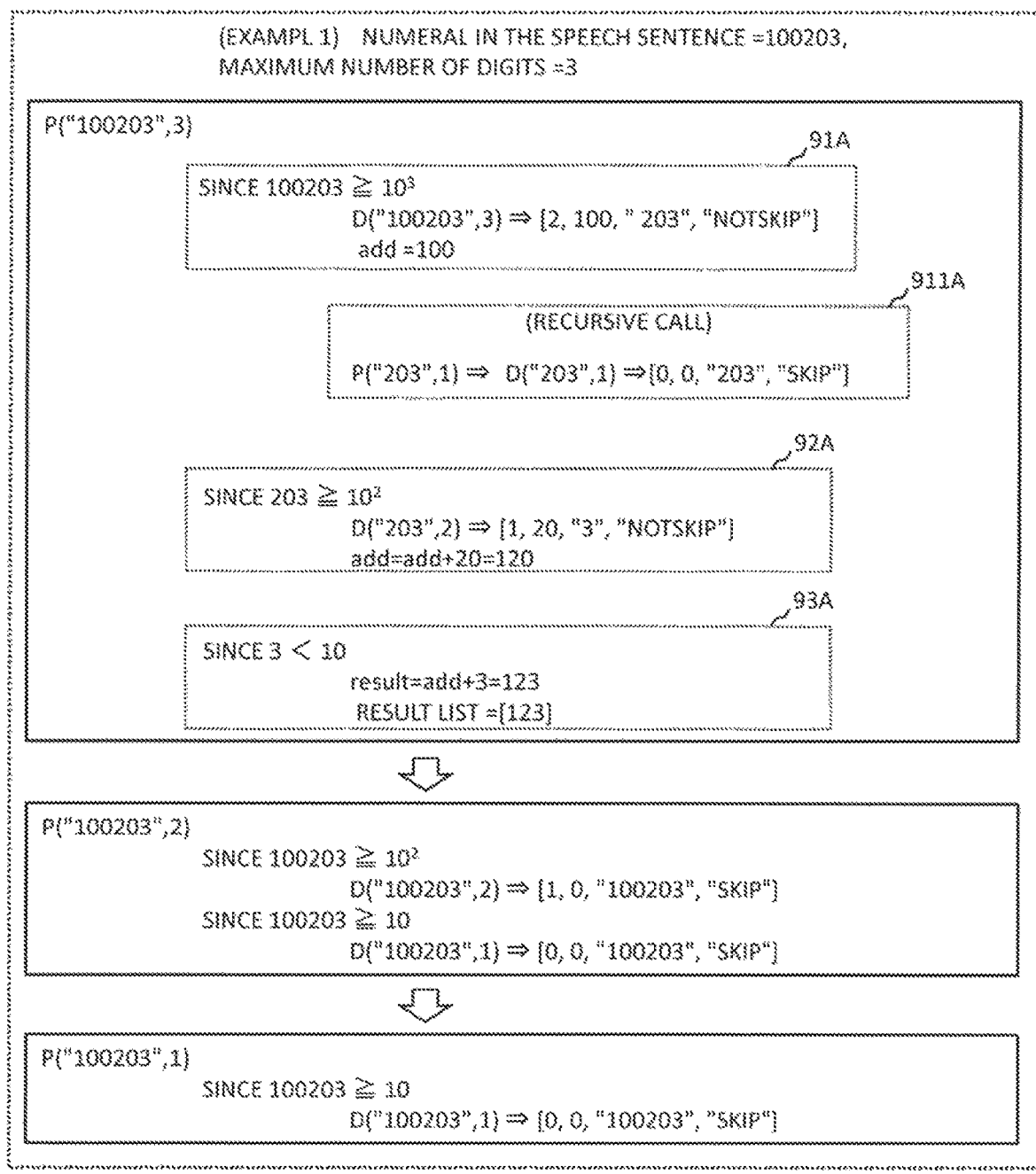
FIG. 9A is a diagram showing a process flow in the specific example 1 of FIG. 5A.

FIG. 9A shows a process flow corresponding to FIGS. 6 to 8 in the specific example 1 of FIG. 5A. In an example of FIG. 9A, the numeral extracted from the speech sentence is "100203" and the maximum number of digits is and therefore, P("100203", 3), P("100203", 2), and P("100203", 1) are executed in sequence (S63).

The process P("100203", 3) includes steps 91A, 92A, and 93A, and a recursive call step 911A. Steps 91A and 92A correspond to the process in the case of No at step 602 of FIG. 7. Step 93A corresponds to the process in the case of Yes at step 602 of FIG. 7. Recursive call step 911A corresponds to step S610 of FIG. 7.

The process P("100203", 3) starts from step 91A. At step 91A, a process is executed for the object character string "100203" and the number of digits "3". Since the integer value "100203" is larger than $10^3$, the process D("100203", 3) is executed (S606).

In the process D("100203", 3), fac=$10^2$, left=100, right="203", div=1 (=100/$10^2$), and mod=0 are obtained. In this case, it is determined that the result of voice recognition is correct (Yes at S666). Since nextD=2 (=3−1), extL=100 (=1×$10^2$), and extR="203" are obtained, "2, 100, '203', 'Notskip'" are returned.

As a result, the character string "100203" is divided into an integer value "100" and a character string "203". The integer value "100" is added to the initial value "0" of the variable (add), so that the value of the variable (add) becomes "100" (S609).

As shown in the recursive call step 911A, the process P(203, 1) is recursively called in the process P("100203", 3) for the remaining character string "203" (step S610).

When step 91A ends, the number of digits d is reduced, and the process goes to step 92A. At step 92A, a process is executed for the remaining character string "203" and the number of digits "2". Since the integer value "203" is larger than $10^2$, the process D("203", 2) is executed (S606).

In the process D("203", 2), fac=10, left=20, right="3", div=2 (=20/10), and mod=0 are obtained. In this case, it is determined that the result of voice recognition is correct (Yes at S666). Since nextD=1 (=2−1), extL=20 (=2×10), and extR="3" are obtained, "1, 20, '3', 'Notskip'" are returned.

As a result, the character string "203" is divided into an integer value "20" and a character string "3". The integer value "20" is added to the value "100" of the variable (add), so that the value of the variable (add) becomes "120" (S609).

When step 92A ends, the number of digits d is reduced, and the process goes to step 93A. At step 93A, a process is executed for the remaining character string "3" and the number of digits "1". Since the integer value "3" is smaller than 10, the value "123" obtained by adding the integer value "3" to the value "120" of the variable (add) is assigned to the variable (result) (S603). This value "123" of the variable (result) is added to the result list (S604).

When the process P("100203", 3) ends, the process P("100203", 2) is executed. In the process P("100203", 2), since "100203" is larger than $10^2$, the process D("100203", 2) is executed (S606).

In the process D("100203", 2), fac=10, left=10, right="0203", div=1 (=10/10), and mod=0 are obtained. In this case, since right starts with "0", it is determined that the voice recognition result is incorrect (No at S666). Therefore, "1 (=2−1), 0, '100203', 'Skip'" are returned.

Since "100203" is larger than 10, process D("100203", 1) is executed (S606).

In the process D("100203", 1), fac=1, left=1, right="00203", div=1 (=1/1), and mod=0 are obtained. In this case, since right starts with "0", it is determined that the result of voice recognition is incorrect (No at S666). Therefore, "0 (=1−1), 0, '100203', 'Skip'" are returned.

When the process P("100203", 2) ends, the process P("100203", 1) is executed. In the process P("100203", 1), since "100203" is larger than 10, the process D("100203", 1) is executed, and "Skip" is returned as described above.

As described above, the result list including only the result value "123" is generated from the numeral "100203" in the speech sentence.

2-8. Specific Example 2 of Process Flow

Figure 9B:
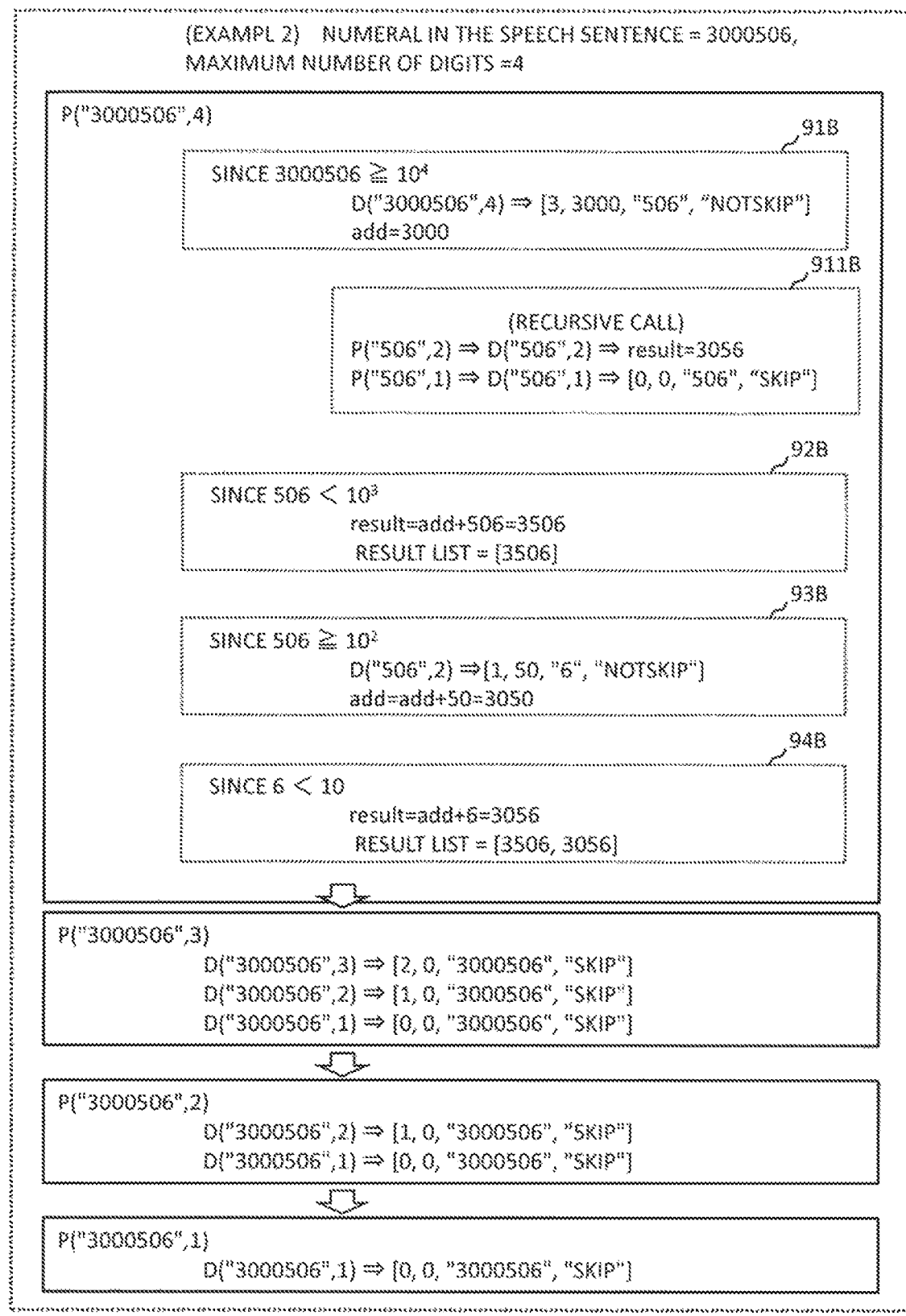
FIG. 9B is a diagram showing a process flow in the specific example 2 of FIG. 5B.

FIG. 9B shows a process flow corresponding to FIGS. 6 to 8 in the specific example 2 of FIG. 5B. In an example of FIG. 9B, the numeral extracted from the speech sentence is "3000506" and the maximum number of digits is "4", and therefore, P("3000506", 4), P("3000506", 3), P("3000506", 2) and P("3000506", 1) are executed in sequence (S63).

The process P("3000506", 4) includes steps 91B, 92B, 93B, and 94B, and a recursive call step 911B. Steps 91B and 93B correspond to the process in the case of No at step 602 of FIG. 7. Steps 92B and 94B correspond to the process in the case of Yes at step 602 of FIG. 7. The recursive call step 911B corresponds to step S610 of FIG. 7.

The process P("3000506", 4) starts from step 91B. At step 91B, a process is executed for the object character string "3000506" and the number of digits "4". Since the integer value "3000506" is larger than $10^4$, the process D("3000506", 4) is executed (S606).

In the process D("3000506", 4), fac=$10^3$, left=3000, right="506", div=3 (=3000/$10^3$), and mod=0 are obtained. In this case, it is determined that the result of voice recognition is correct (Yes at S666). Therefore, nextD=3 (=4−1), extL=3000 (=3×$10^3$), and extR="506" are obtained, and "3, 3000, '506', 'Notskip'" are returned.

As a result, the character string "3000506" is divided into an integer value "3000" and a character string "506". The integer value "3000" is added to the initial value "0" of the variable (add), so that the value of the variable (add) becomes "3000" (S609).

As shown in the recursive call step 911B, in the process P("3000506", 4), the process P(506, 2) and the process P(506, 1) are recursively called for the remaining character string "506". (Step S610).

When step 91B ends, the number of digits d is reduced, and the process goes to step 92B. At step 92B, a process is executed for the remaining character string "506" and the number of digits "3". Since the integer value "506" is smaller than $10^3$, a value "3506" obtained by adding the integer value "506" to the value "3000" of the variable (add) is assigned to the variable (result) (S603). The value "3506" of the variable (result) is added to the result list (S604).

When step 92B ends, the number of digits d is reduced, and the process goes to step 93B. At step 93B, a process is executed for the remaining character string "506" and the number of digits "2". Since the integer value "506" is larger than $10^2$, the process D("506", 2) is executed (S606).

In the process D("506", 2), fac=10, left=50, right="6", div=5 (=50/10), and mod=0 are obtained. In this case, it is determined that the result of voice recognition is correct (Yes at S666). Therefore, nextD=1 (=2−1), extL=50 (=5× 10), and extR="6" are obtained, and "1, 50, '6', 'Notskip'" are returned.

As a result, the character string "506" is divided into an integer value "50" and a character string "6". The integer value "50" is added to the value "3000" of the variable (add), so that the value of the variable (add) becomes "3050" (S609).

When step 93B ends, the number of digits d is reduced, and the process goes to step 94B. At step 94B, a process is executed for the remaining character string "6" and the number of digits "1". Since the integer value "6" is smaller than 10, the value "3056" obtained by adding the integer value "6" to the value "3050" of the variable (add) is assigned to the variable (result) (S603). The value "3056" of the variable (result) is added to the result list (S604).

When the process P("3000506", 4) ends, the process P("3000506", 3) is executed. In the process P("3000506", 3), since the integer value "3000506" is larger than $10^3$, the process D("3000506", 3) is executed.

In the process D("3000506", 3), fac=$10^2$, left=300, right="0506", div=3 (=300/$10^2$), and mod=0 are obtained. In this case, since right starts with "0", it is determined that the result of voice recognition is incorrect (No at S666). Therefore, "2 (=3−1), 0, '3000506', 'Skip'" are returned.

Since the integer value "3000506" is larger than $10^2$, the process D("3000506", 2) is executed.

In the process D("3000506", 2), fac=10, left=30, right="00506", div=3 (=30/10), and mod=0 are obtained. In this case, since right starts with "0", it is determined that the result of voice recognition is incorrect (No at S666). Therefore, "1 (=2−1), 0, '3000506', 'Skip'" are returned.

Since the integer value "3000506" is larger than 10, the process D("3000506", 1) is executed.

In the process D("3000506", 1), fac=1, left=3, right="000506", div=3 (=3/1), and mod=0 are obtained. In this case, since right starts with "0", it is determined that the result of voice recognition is incorrect (No at S666). Therefore, "0, 0, '3000506', 'Skip'" are returned.

When the process P("3000506", 3) ends, the process P("3000506", 2) is executed. When the process P("3000506", 2) ends, the process P("3000506", 1) is executed. In the process P("3000506", 2) and the process P("3000506", 1), the process D("3000506", 2) and the process D("3000506", 1) described above are executed, and "Skip" is returned.

As described above, the result list including the result values "3506" and "3056" is generated from the numeral "3000506" in the speech sentence.

2-9. Selection of Result Value

Figure 10:
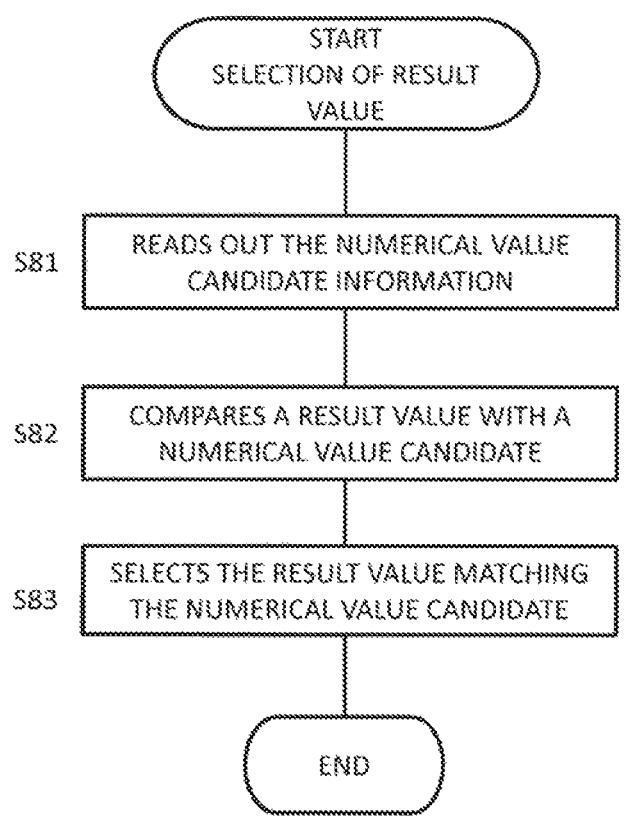
FIG. 10 is a flowchart for explaining selection of a result value.

FIG. 10 shows an operation of selecting the result value (details of S8 of FIG. 4). The controller 11 reads out the numerical value candidate information 162 from the storage 16 (S81). The controller 11 compares a result value included in the result list with a numerical value candidate included in the numerical value candidate information 162 (S82). The controller 11 selects the result value matching the numerical value candidate (S83). As a result, at step S9, the numeral in the speech sentence is changed to indicate the selected result value. The numerical value candidate information 162 may include a number indicative of a numerical value candidate as a numerical value or a character string. The result value may be compared with the numerical value candidate in accordance with the form of the numerical value or the character string.

3. Effects and Supplements Etc

The voice recognition apparatus 1 includes the communication unit 17, which is an example of an acquisition unit acquiring a speech sentence that is a result of voice recognition of a speech, the storage 16 storing the maximum digit number information 161 indicative of the maximum number of digits, and the controller 11, when the number of digits of a first numerical value indicated by a first numeral included in the speech sentence is larger than the maximum number of digits, replacing the first numeral in the speech sentence with a second numeral indicative of a second numerical value having the number of digits equal to or less than the maximum number of digits. The controller 11 divides the first numeral into multiple numerals and adds numerical values respectively indicated by the multiple numerals to calculate the second numerical value. The second numerical value corresponds to the result value described above.

As a result, when the numeral included in the speech is erroneously recognized, the erroneously recognized numeral can be corrected to indicate a numerical value having the number of digits equal to or less than the maximum number of digits calculated in accordance with the voice of the speech. Therefore, the voice recognition error of a numeral can be reduced.

The storage 16 stores the numerical value candidate information 162 indicative of one or more numerical value candidates, and when multiple second numerical values are obtained from the first numeral, the controller 11 replaces the first numeral in the speech sentence with the second numeral indicative of the second numerical value matching the numerical value candidate.

As a result, even when the multiple second numerical values are calculated, the numeral in the speech sentence can accurately be corrected.

Other Embodiments

As described above, the embodiment has been described as an example of the technique disclosed in the present application. However, the technique in the present disclosure is not limited thereto and is also be applicable to embodiments with changes, substitutions, additions, omissions, etc. made as appropriate. Therefore, other embodiments will hereinafter be exemplified.

Figure 11:
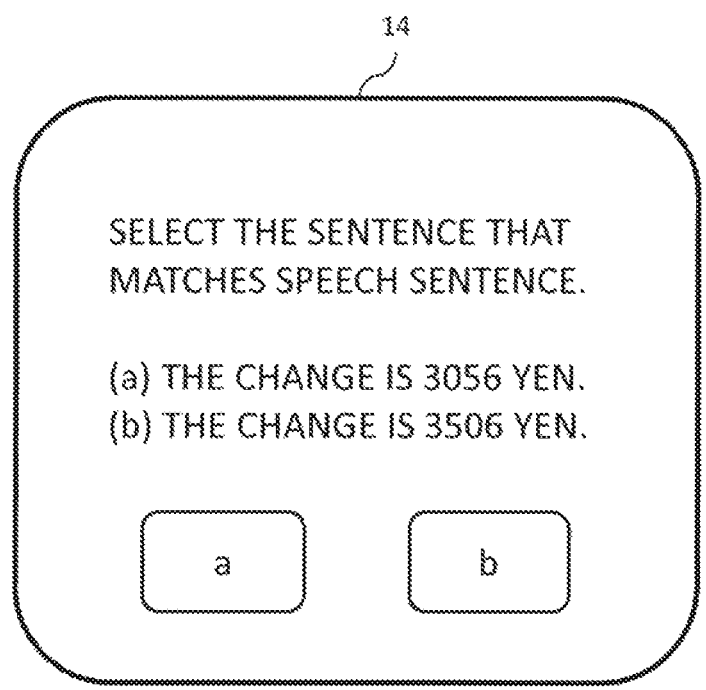
FIG. 11 is a diagram showing an example of a selection screen for result values.

In the embodiment, when multiple result values are included in the result list, the voice recognition apparatus 1 compares the multiple result values with the numerical value candidates included in the numerical value candidate information 162 and selects one result value as described in the example. However, a user may be allowed to select any one of the multiple result values. FIG. 11 shows an example of a selection screen for result values. The selection screen is a screen for selecting any one of the multiple result values. For example, the voice recognition apparatus 1 temporarily replaces the numeral in the speech sentence to indicate each of the multiple result values included in the result list generated at step S6 of FIG. 4, thereby generating multiple corrected speech sentences. As shown in FIG. 11, the voice recognition apparatus 1 displays the selection screen containing the multiple corrected speech sentences on the display 14. The voice recognition apparatus 1 accepts selection of any one speech sentence by the user via the touch panel 13. In other words, selection of any one numeral is accepted out of the numerals indicative of the respective multiple result values. At step S9 of FIG. 4, the voice recognition apparatus 1 determines the corrected speech sentence selected by the user as the speech sentence corresponding to the speech. Instead of displaying the multiple corrected speech sentences on the selection screen, only the numerals indicating the result values may be displayed. In this case, at step S9 of FIG. 4, the speech sentence is corrected based on the numeral selected by the user.

In the embodiment, voice recognition, translation, and voice synthesis are performed by the voice recognition server 3, the translation server 4, and the voice synthesis server 5, respectively; however, the present disclosure is not limited thereto. At least one processing of voice recognition, translation, and voice synthesis may be performed in the voice recognition apparatus 1. For example, the voice recognition apparatus 1 may have the same function as the voice recognition server 3. The voice recognition apparatus 1 may have all the same functions as the voice recognition server 3, the translation server 4, and the voice synthesis server 5. In this case, the voice recognition apparatus 1 may not have the communication unit 17.

Overview of Embodiments (1) A voice recognition apparatus according to the present disclosure includes: an acquisition unit acquiring a speech sentence that is a result of voice recognition of a speech; a storage storing digit number information indicative of the maximum number of digits; and a controller, when a number of digits of a first numerical value indicated by a first numeral included in the speech sentence is larger than the maximum number of digits, replacing the first numeral in the speech sentence with a second numeral indicative of a second numerical value having the number of digits equal to or less than the maximum number of digits, and the controller divides the first numeral into a plurality of numerals and adds numerical values respectively indicated by the plurality of numerals to calculate the second numerical value.

As a result, even when the numeral included in the speech is erroneously recognized, the erroneously recognized numeral can be corrected to indicate the numerical value calculated in accordance with the voice of the speech. Therefore, the voice recognition error of a numeral can be reduced.

(2) In the voice recognition apparatus of (1), the storage may store candidate information indicative of one or more numerical value candidates, and when a plurality of second numerical values is obtained from the first numeral, the controller may replace the first numeral in the speech sentence with the second numeral indicative of the second numerical value matching the numerical value candidate.

As a result, even when a plurality of second numerical values is calculated, the numeral in the speech sentence can accurately be corrected.

(3) The voice recognition apparatus of (1) may further include: a display displaying, when a plurality of second numerical values is obtained from the first numeral, a plurality of second numerals indicative of the plurality of second numerical values; and an input device accepting an operation of a user selecting any one of the plurality of second numerals, and the controller may replace the first numeral in the speech sentence with the second numeral selected by the user.

As a result, even when the plurality of second numerical values are calculated, the numeral in the speech sentence can accurately be corrected.

(4) A voice recognition method of the present disclosure includes the steps of: a voice recognition apparatus acquiring a speech sentence that is a result of voice recognition of a speech; the voice recognition apparatus acquiring digit number information indicative of the maximum number of digits; and when the number of digits of a first numerical value indicated by a first numeral included in the speech sentence is larger than the maximum number of digits, the voice recognition apparatus replacing the first numeral in the speech sentence with a second numeral indicative of a second numerical value having the number of digits equal to or less than the maximum number of digits, and the second numerical value is calculated by dividing the first numeral into a plurality of numerals and adding numerical values respectively indicated by the plurality of numerals.

The voice recognition apparatus and the voice recognition method according to all claims of the present disclosure are implemented by cooperation etc. with hardware resources, for example, a processor, a memory, and a computer program.

The present disclosure is applicable to a voice recognition apparatus recognizing a voice of a speaker.

The invention claimed is:

1. A voice recognition apparatus includes:
a communication circuit acquiring a speech sentence that is a result of voice recognition of a speech;

a storage storing digit number information indicative of the maximum number of digits; and a control circuit, when a number of digits of a first numerical value indicated by a first numeral included in the speech sentence is larger than the maximum number of digits, replacing the first numeral in the speech sentence with a second numeral indicative of a second numerical value having the number of digits equal to or less than the maximum number of digits, wherein the control circuit divides the first numeral into a plurality of numerals and adds numerical values respectively indicated by the plurality of numerals to calculate the second numerical value.

2. The voice recognition apparatus according to claim 1, wherein the storage stores candidate information indicative of one or more numerical value candidates, and wherein when a plurality of second numerical values is obtained from the first numeral, the control circuit replaces the first numeral in the speech sentence with the second numeral indicative of the second numerical value matching the numerical value candidate.

3. The voice recognition apparatus according to claim 1, further comprising:

a display displaying, when a plurality of second numerical values is obtained from the first numeral, a plurality of second numerals indicative of the plurality of second numerical values, and an input device accepting an operation of a user selecting any one of the plurality of second numerals, wherein the control circuit replaces the first numeral in the speech sentence with the second numeral selected by the user.

4. A voice recognition method comprising the steps of: by use of a control circuit, acquiring a speech sentence that is a result of voice recognition of a speech;

acquiring digit number information indicative of the maximum number of digits; and when the number of digits of a first numerical value indicated by a first numeral included in the speech sentence is larger than the maximum number of digits, replacing the first numeral in the speech sentence with a second numeral indicative of a second numerical value having the number of digits equal to or less than the maximum number of digits, wherein the second numerical value is calculated by dividing the first numeral into a plurality of numerals and adding numerical values respectively indicated by the plurality of numerals.

5. A non-transitory computer-readable recording medium storing a computer program causing a control circuit included in a voice recognition apparatus to execute:

acquiring a speech sentence that is a result of voice recognition of a speech;

acquiring digit number information indicative of the maximum number of digits; and when the number of digits of a first numerical value indicated by a first numeral included in the speech sentence is larger than the maximum number of digits, the voice recognition apparatus replacing the first numeral in the speech sentence with a second numeral indicative of a second numerical value having the number of digits equal to or less than the maximum number of digits, wherein the second numerical value is calculated by dividing the first numeral into a plurality of numerals and adding numerical values respectively indicated by the plurality of numerals.

\* \* \* \* \*